(12) United States Patent
Hanley et al.

(10) Patent No.: US 12,742,638 B2
(45) Date of Patent: Sep. 22, 2026

(54) ADAPTER FOR ELECTRICAL BOX

(71) Applicant: Innovations Specific, Inc., Fort Collins, CO (US)

(72) Inventors: Jerome Charles Hanley, Fort Collins, CO (US); Duane Neil Genzlinger, Pierce, CO (US)

(73) Assignee: Innovations Specific, Inc., Fort Collins, CO (US)

( * ) Notice: Subject to any disclaimer, the term of this patent is extended or adjusted under 35 U.S.C. 154(b) by 809 days.

(21) Appl. No.: 17/960,696

(22) Filed: Oct. 5, 2022

(65) Prior Publication Data

US 2023/0104610 A1 Apr. 6, 2023

Related U.S. Application Data

(60) Provisional application No. 63/262,155, filed on Oct. 6, 2021.

(51) Int. Cl.
*G01B 11/27* (2006.01)
*H02G 3/08* (2006.01)

(52) U.S. Cl.
CPC ............... *G01B 11/27* (2013.01); *H02G 3/08* (2013.01)

(58) Field of Classification Search
CPC ........... H02G 3/08; H02G 3/12; G01B 5/0002
See application file for complete search history.

(56) References Cited

U.S. PATENT DOCUMENTS 5,012,043 A * 4/1991 Seymour .................. H02G 3/18 324/133
6,573,446 B1 * 6/2003 Umstead ................ H02G 3/125 174/58
8,347,491 B1 * 1/2013 Baldwin ................ H02G 3/123 29/745
8,575,484 B1 * 11/2013 Witherbee ............. H02G 3/126 174/58
9,391,438 B1 * 7/2016 Gretz ....................... H02G 3/12
10,530,141 B1 * 1/2020 Fioriello .................. H02G 3/14
10,784,666 B2 * 9/2020 Korcz .................... H02G 3/126
11,729,925 B2 * 8/2023 Oh ....................... H05K 5/0217 248/51
12,463,408 B2 * 11/2025 Gendill .................. H02G 3/123
2003/0079898 A1 * 5/2003 Kidman ................. H02G 3/086 174/66
2005/0150675 A1 * 7/2005 Pierce ...................... H02G 3/14 174/58
2009/0224423 A1 * 9/2009 Vigorito ............ B29C 45/14311 174/565
2012/0031640 A1 * 2/2012 Korcz .................... H02G 3/086 174/66
2012/0088399 A1 * 4/2012 Perritt .................... H02G 3/126 439/535
2017/0012421 A1 * 1/2017 Terwilleger ............ H02G 3/125
2020/0378553 A1 * 12/2020 Oh ....................... F16M 13/022

FOREIGN PATENT DOCUMENTS

CA 2481856 C * 5/2009 ............ H02G 3/125

* cited by examiner

*Primary Examiner* — Jeffrey T Carley
(74) *Attorney, Agent, or Firm* — William W. Cochran; Cochran Freund & Young LLC

(57) ABSTRACT

Disclosed are adapters for switches and outlets that allow switches and outlets to be moved laterally within the electrical box to accommodate wall features that are located adjacent to the electrical box.

6 Claims, 12 Drawing Sheets

410 Switch Plate Cover
408 Switch
402 Electrical Box
Cover Plate Screw 424
426 Cover Plate Screw Top Adapter 404
408 Switch
402 Electrical Box
406 Bottom Adapter
416
418
Switch Mounting Screw 420
422 Switch Mounting Screw

ADAPTER FOR ELECTRICAL BOX

CROSS-REFERENCE TO RELATED APPLICATION

This Non-Provisional patent application claims the benefit of the U.S. Provisional Patent Application No. 63/262,155, entitled "Adapter for Electrical Box", which was filed with the U.S. Patent & Trademark Office on Oct. 6, 2021 and is specifically incorporated herein by reference for all that it discloses and teaches.

BACKGROUND

The mounting of electrical switches and electrical outlets in plastic electrical boxes has become a standard and accepted technique used in many jurisdictions. The unified building code has authorized the use of plastic electrical boxes for use in electrical systems for many years. Plastic electrical boxes offer many advantages over electrical boxes and provide the durability and safety that is as good as, or better than, metal boxes. Both switches and outlets can be mounted in plastic boxes.

SUMMARY

An embodiment of the present invention may therefore comprise a method of adjusting the location of a switch or outlet in an electrical box comprising: mounting a first adapter on the electrical box with a first mounting screw that screws into a first standard electrical box opening; mounting a second adapter on the electrical box with a second mounting screw that screws into a second standard electrical box opening; tightening the first mounting screw to secure the first adapter to the electrical box; tightening the second mounting screw to secure the second adapter to the electrical box; mounting the switch or outlet to the first adapter with a first switch or outlet mounting screw that screws into a first switch or outlet attachment opening in the first adapter so that the switch or outlet is displaced laterally in the electrical box by the first adapter; mounting the switch or outlet to the second adapter with a second switch or outlet screw that screws into a second switch or outlet attachment opening in the second adapter so that the switch or outlet is displaced laterally in the electrical box by the second adapter.

An embodiment of the present invention may further comprise a switch or outlet adapter system for mounting a switch or outlet to an electrical box comprising: a first adapter; a second adapter; a flange portion of the first adapter that is structured to form a slot for a first adapter mounting screw that mounts the first adapter to a first standard electrical box opening; a flange portion of the second adapter that is structured to form a slot for a second adapter mounting screw that mounts the second adapter to a second standard electrical box opening; a first adapter switch or outlet opening reinforcement disposed on the first adapter that provides a support for a first switch or outlet mounting screw that can secure the switch or outlet to the first adapter; a second adapter switch or outlet opening reinforcement disposed on the second adapter that provides a support for a second switch or outlet mounting screw that can secure the switch or outlet to the first adapter.

DETAILED DESCRIPTION OF THE EMBODIMENTS

Figure 1A:
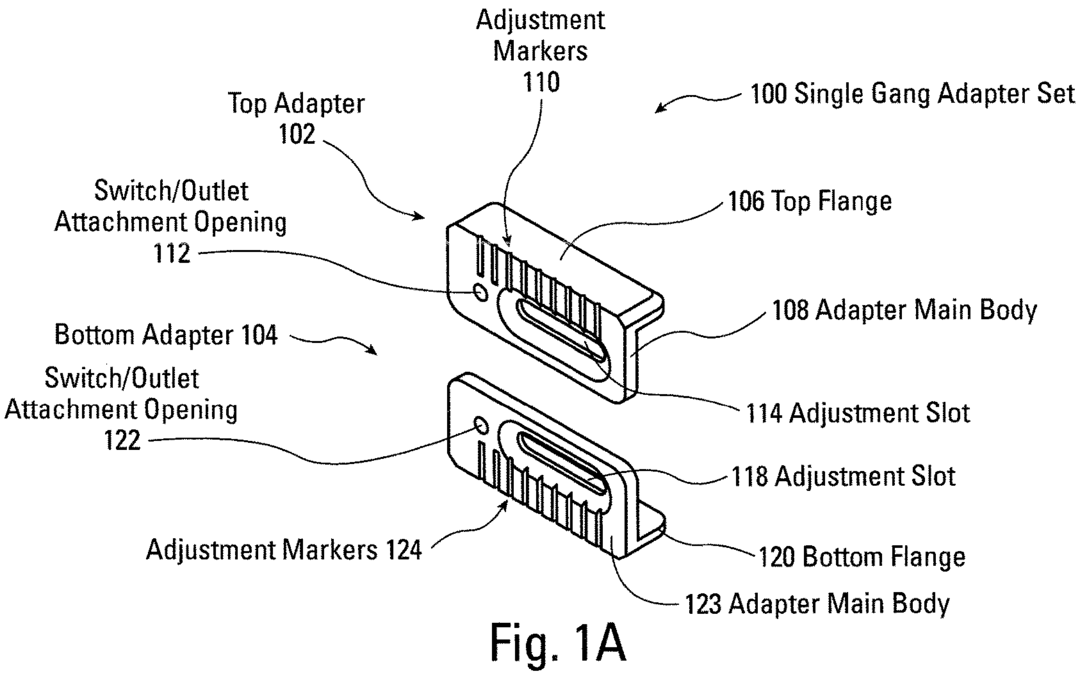
FIG. 1A is an isometric view of one embodiment of a single gang adapter.

FIG. 1A is an isometric view of a top adapter 102 and a bottom adapter 104 of a single gang adapter set 100. Top adapter 102 has a top flange 106 and an adapter main body 108. An adjustment slot 114 is formed in the structure of the adapter main body 108. The adjustment slot 114, as well as all of the adjustment slots disclosed herein, can be molded into the adapters or formed later by cutting and/or drilling the adapters. A switch or outlet attachment opening 112 is also located in the adapter main body 108 at a location that is adjacent to the adjustment slot 114. The adapter main body 108 provides an opening for a mounting screw of an outlet or switch to be mounted to top adapter 102. Adapter main body 108 also has a series of adjustment markers 110 that allow the user to place the top adapter 102 in a location that will correspond with, and align with, bottom adapter 104 when top adapter 102 and bottom adapter 104 are mounted on an electrical box. Adjustment markers, disclosed throughout this application, are not necessary, but provide alignment information that is helpful in certain situations.

Bottom adapter 104 of FIG. 1A has an adjustment slot 118 formed in the adapter main body 123, as well as a switch or outlet attachment opening 122 that is located in the adapter main body 123. The switch or outlet attachment opening 122 is an opening that allows the mounting screw of a switch or outlet to be secured to the bottom adapter 104. Adjustment markers 124 allow a user to visually align the bottom adapter 104 on the electrical box so that the bottom adapter is mounted properly with respect to the top adapter 102.

Figure 1B:
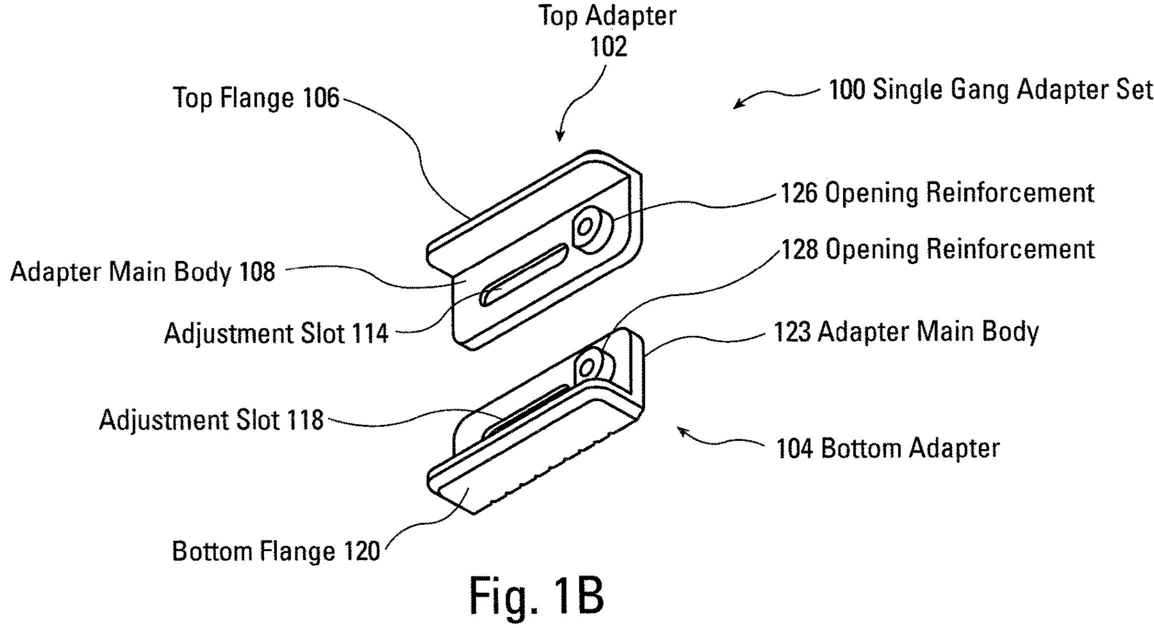
FIG. 1B is an isometric view of the embodiment of FIG. 1A.

FIG. 1B is an isometric view of the back side of the top adapter 102 and bottom adapter 104 for the single gang adapter set 100. Again, top adapter 102 has a top flange 106 and an adjustment slot 114 formed in the adapter main body 108. An opening reinforcement 126 provides reinforcement for the top mounting screw of either a switch or outlet. Since the single gang adapter set 100, as well as the other adapters disclosed herein, are made of a plastic material, the mounting screws of both switches and outlets compress the plastic material of the opening reinforcement 126 so that the opening reinforcement 126 become self-threading.

Bottom adapter 104 of FIG. 1B has an adjustment slot 118 located in the adapter main body 123. Bottom flange 120 extends from the adapter main body 123 and fits over the outside surface of the electrical box when mounted on the electrical box. Opening reinforcement 128 is similar to the opening reinforcement 126 and provides additional support to the bottom mounting screw of either a switch or outlet.

Figures 2A, 2B:
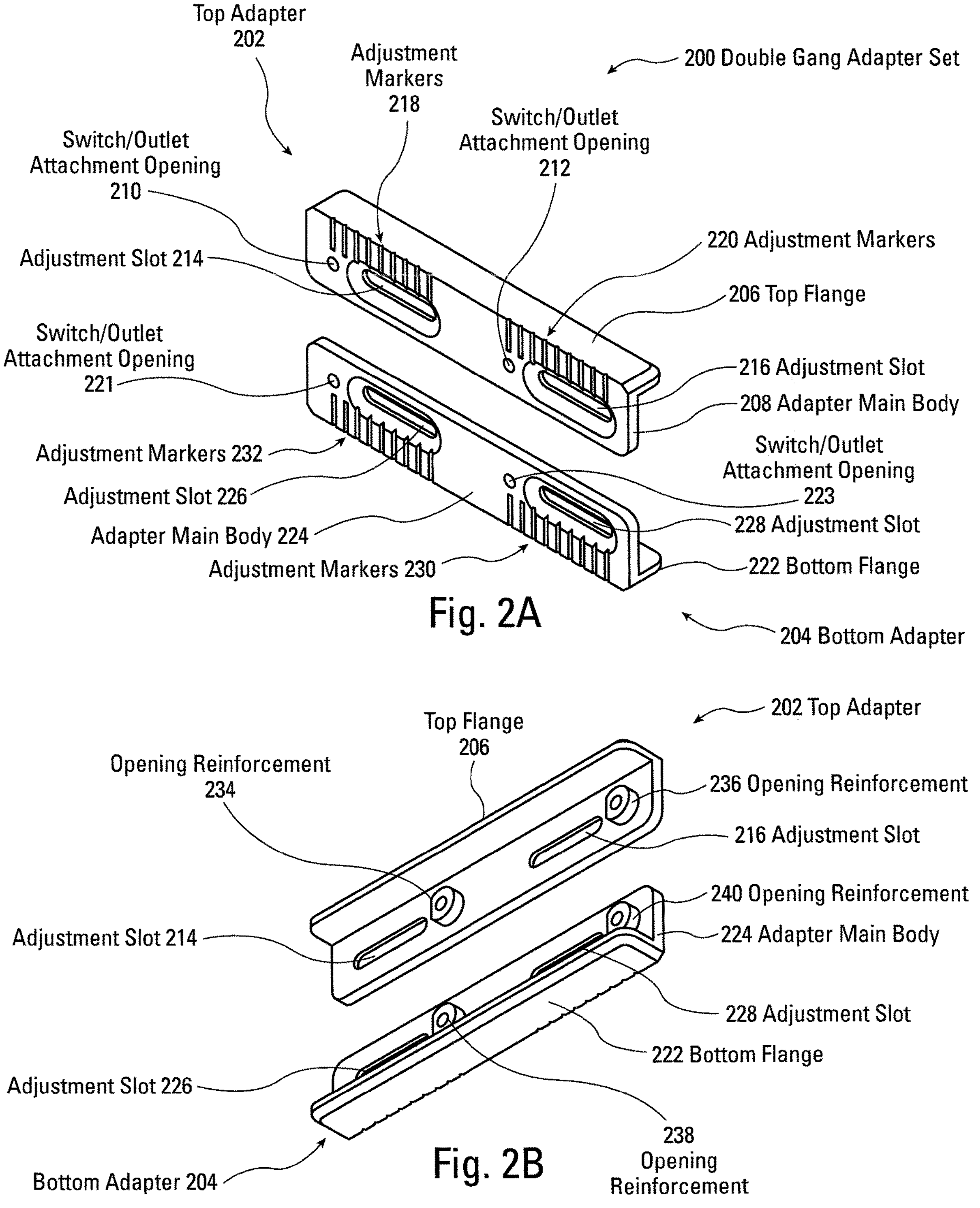
FIG. 2A is an isometric view of a double gang adapter.
FIG. 2B is another isometric view of the embodiment of FIG. 2A.

FIG. 2A is an isometric view of a double gang adapter set 200. As illustrated in FIG. 2A, the double gang adapter set 200 has a top adapter 202 and a bottom adapter 204. Top adapter 202 has an adapter main body 208, which is connected to a top flange 206. Top flange 206 extends over the top edge of an electrical box when mounted on an electrical box. The adapter main body 208 has a switch or outlet attachment opening 210 and a switch or outlet attachment opening 212 formed in its structure. Switch or outlet attachment opening 210 allows the attachment screws of a first switch or outlet to be mounted to the top adapter 202 using the standard mounting screw of the switch or outlet. Adjustment slot 214 formed in adapter main body 208 allows the top adapter 202 to be mounted with a first screw opening on an electrical box so that the top adapter 202 can be moved laterally on the box. Similarly, adjustment slot 226, formed in adapter main body 224, allows a mounting screw to attach to a second screw opening on the double gang electrical box. Switch or outlet attachment opening 212 provides an opening for a mounting screw on a second switch or outlet. Adjustment markers 218, 220 allow the top adapter 202 to be aligned in a specific location on the electrical box.

Bottom adapter 204, illustrated in FIG. 2A, has an adapter main body 224 and a bottom flange 222. Bottom flange 222 is disposed adjacent to the bottom surface of an electrical box when mounted on an electrical box. Switch or outlet attachment opening 221 provides an opening for mounting a first switch or outlet. Switch or outlet attachment opening 223 allows for attachment of a second switch or outlet. The standard mounting screws provided with switches and outlets can be screwed into the switch or outlet attachment openings 221, 223. Adjustment slot 226 and adjustment slot 228 allow the bottom adapter 204 to be slidably mounted on an electrical box. Adjustment markers 230, 232 provide a visual indication of the location of the bottom adapter 204 on the electrical box so that it aligns with the top adapter 202.

FIG. 2B is a back view of the top adapter 202 and bottom adapter 204, illustrated in FIG. 2A. FIG. 2B illustrates the adjustment slots 214, 216, as well as top flange 206 in the top adapter 202. Opening reinforcements 234, 236 provide reinforcement for mounting screws on the switches and outlets. Bottom adapter 204 has opening reinforcements 238, 240 that support mounting screws on switches and outlets. FIG. 2B also illustrates adjustment slots 226, 228 and main body 224 of the bottom adapter 204.

Figures 3A, 3B:
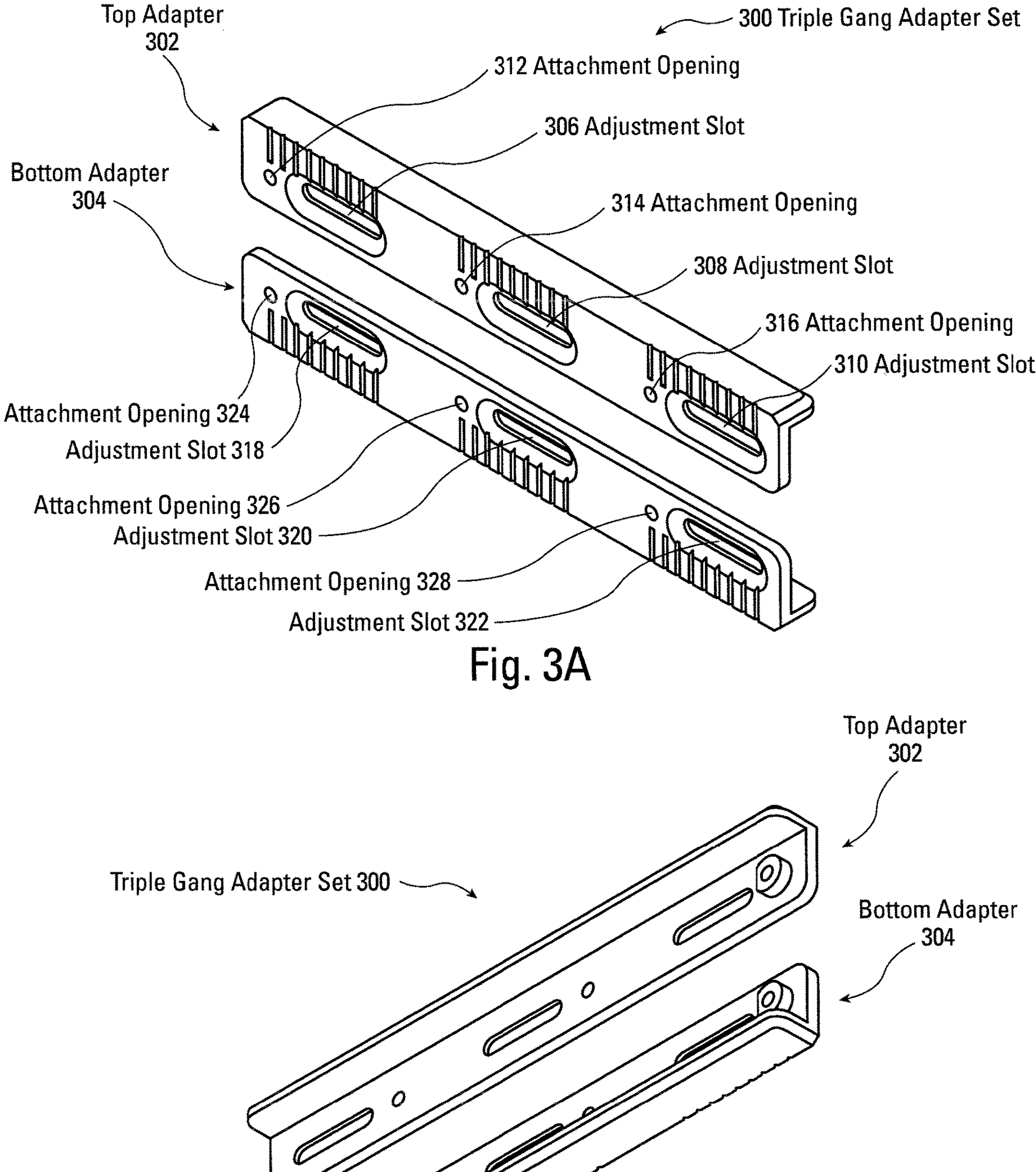
FIG. 3A is an isometric view of an embodiment of a triple gang adapter.
FIG. 3B is another isometric view of the embodiment of FIG. 3A.

FIG. 3A is an isometric view of an embodiment of a triple gang adapter set 300 for mounting three switches or three outlets, or any combination thereof, in a three gang electrical box. Top adapter 302 has three attachment openings, attachment openings 312, 314, 316. The attachment openings 312, 314, 316 allow for three outlets or switches, or any combination, to be mounted on the top adapter 302. Adjustment slots 306, 308, 310 allow mounting screws to slidably mount the top adapter 302 to an electrical box. Bottom adapter 304 has attachment openings 324, 326, 328, which allow any combination of outlets and switches to be mounted on the bottom adapter 304. Attachment slots 318, 320, 322 allow the bottom adapter 304 to be slidably mounted onto an electrical box.

FIG. 3B is an isometric view of the back side of the triple gang adapter set 300. FIG. 3B illustrates the top adapter 302 and bottom adapter 304.

Figure 4:
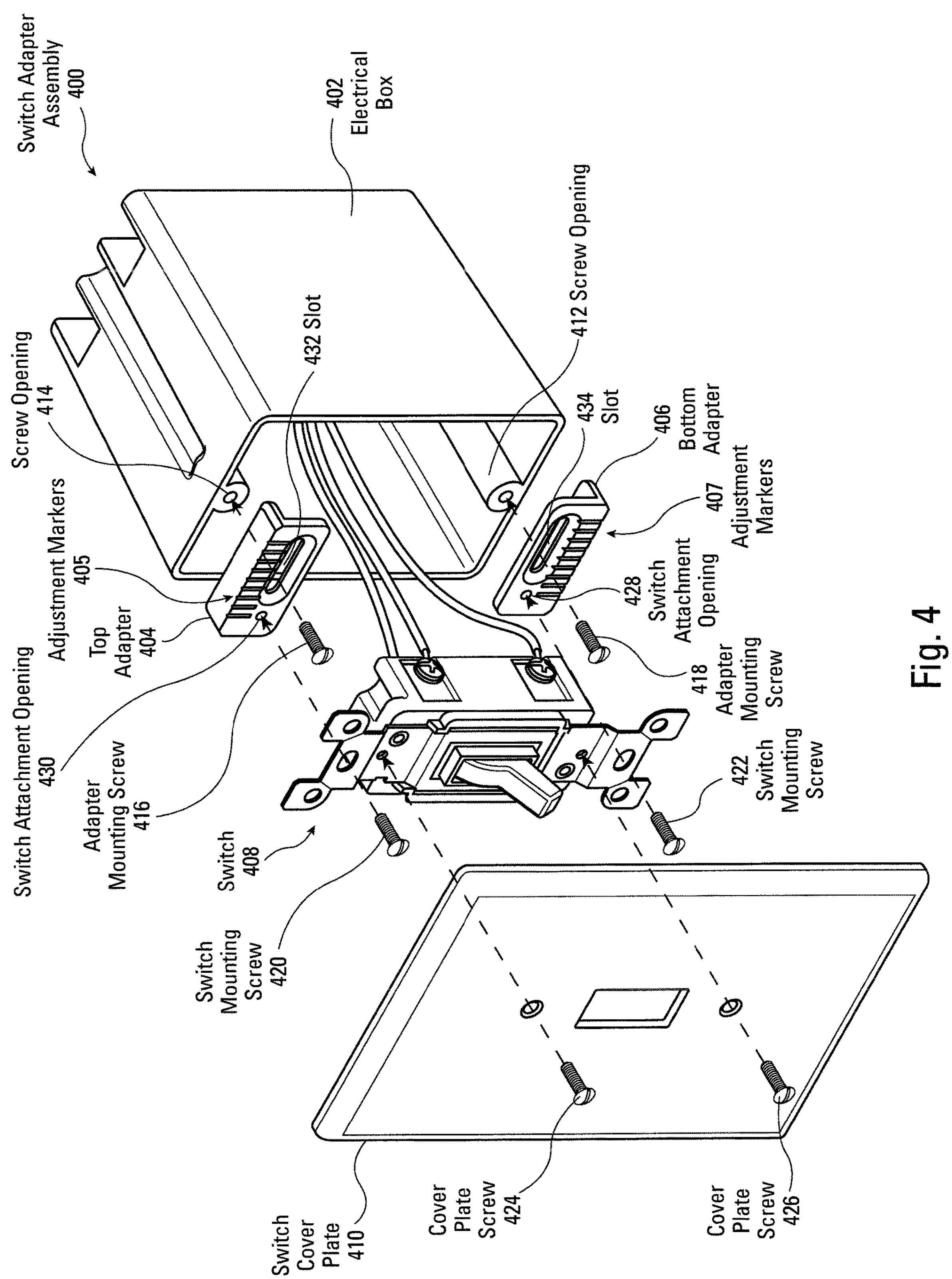
FIG. 4 is an isometric assembly view of the manner in which a single gang adapter can be utilized for mounting a switch.

FIG. 4 is an assembly view of a switch adapter assembly 400, illustrating the manner in which the top and bottom adapters 404, 406 are mounted on an electrical box 402. As illustrated in FIG. 4, top adapter 404 is mounted with an adapter mounting screw 416 in screw opening 414 of electrical box 402. The adjustment markers 405 provide a visual indication of the location of the top adapter 404 with respect to electrical box 402. Switch attachment opening 430 provides an opening for switch mounting screw 420 to attach the switch 408 to the top adapter 404. Adapter mounting screw 418 attaches the bottom adapter 406 to the electrical box 402. Adapter mounting screw 418 screws into the screw opening 412. Adjustment markers 407 provide a visual indication of the location of the bottom adapter 406 with respect to the electrical box 402. Screw 418 should be aligned with an adjustment marker 407 that corresponds to the alignment of adapter mounting screw 416 with an adjustment marker 405. In this manner, the switch 408 can be mounted straight in the electrical box 402. Switch mounting screw 420 mounts the top portion of the switch 408 to the top adapter 404. Switch mounting screw 422 mounts the bottom portion of the switch 408 to the bottom adapter 406. Cover plate screw 424 passes through the switch cover plate 410 and mounts the top portion of the switch cover plate 410 to an opening in the switch 408. Switch cover plate screw 426 passes through a bottom portion of the switch cover plate 410 and mounts the bottom portion of the switch cover plate 410 to the bottom portion of the switch 408. Adapter mounting screws 416, 418 can be loosened so that the top adapter 404 and the bottom adapter 406 can be slid into a desired location to mount switch 408 within the electrical box 402.

Figure 5B:
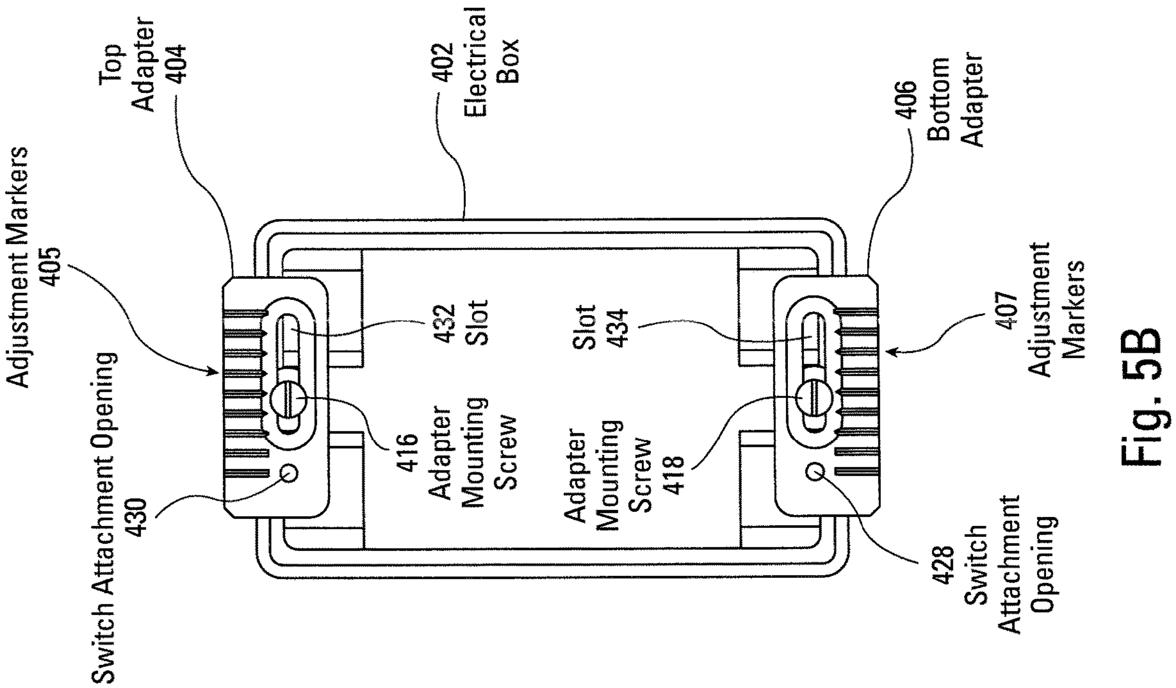
FIG. 5B is a front view of an electrical box with a single gang adapter attached to the electrical box.
Figure 5A:
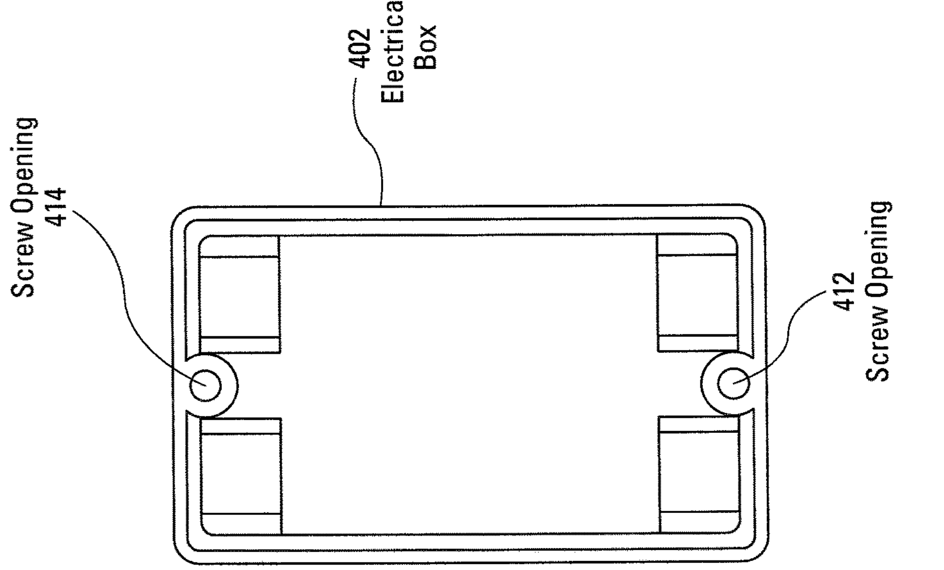
FIG. 5A is a front view of an electrical box.

FIG. 5A is a front view of the electrical box 402 of FIG. 4. FIG. 5A illustrates the screw opening 414 and the screw opening 412 in the electrical box 402.

FIG. 5B is a front view of the electrical box 402, a top adapter 404 and a bottom adapter 406 mounted to the electrical box 402. As illustrated in FIG. 5B, the adapter mounting screws 416, 418 are aligned with corresponding adjustment markers 405, 407. As also illustrated in FIG. 5B, the switch attachment openings 428, 430 are aligned on the left side of the electrical box 402 so that a switch or outlet mounted on the switch attachment openings 428, 430 will be located on the left side of electrical box 402. If it is desired to mount the switch or outlet on the right side of the box, the top adapter 404 and the bottom adapter 406 can be swapped with each other. The slots 432, 434 allow for adjustment of the location of the switch attachment openings 428, 430 with respect to electrical box 402.

Figures 5C, 5D:
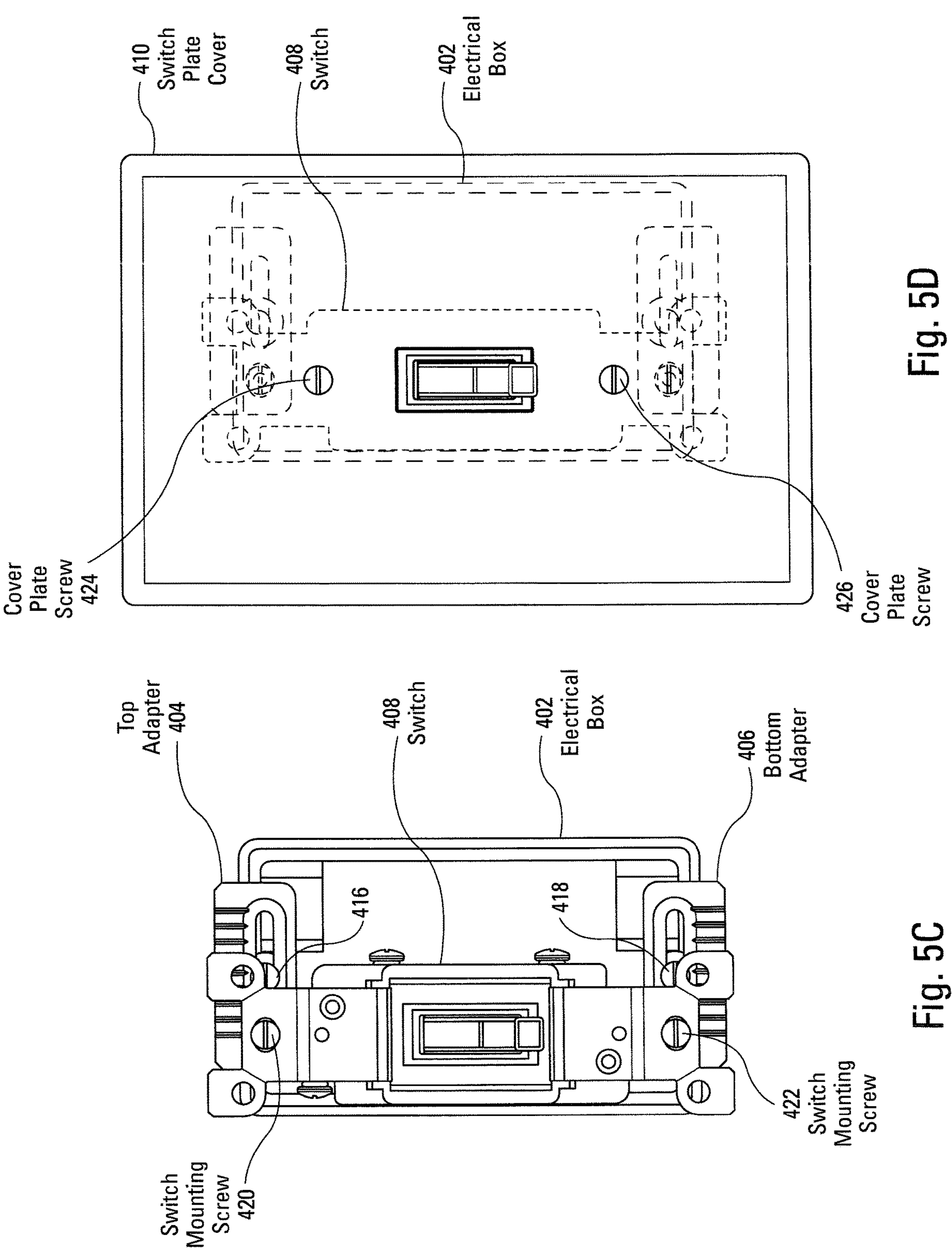
FIG. 5C is a front view of an electrical switch mounted in an electrical box with adapters that allow the electrical switch to be moved to a side of the box.
FIG. 5D is a front view of the electrical box and switch with a switch cover plate mounted over the switch and electrical box.

FIG. 5C is an illustration of FIG. 5B with the switch 408 mounted on the top adapter 404 and bottom adapter 406. Switch mounting screws 420, 422 are screwed into switch attachment opening 430, 428 (FIG. 5B) respectively. As shown, switch 408 is mounted on the left side of the electrical box 402.

FIG. 5D is an illustration of FIG. 5C with a switch cover plate 410 mounted to the switch 408. As illustrated in FIG. 5D, the right side of the switch cover plate is slid to the left to a location in which the switch cover plate 410 still covers the electrical box 402 but leaves ample room on the right side of the electrical box 402 for wall features such as trim and other features. A clear advantage here is that the electrical box 402 is still completely covered by the switch cover plate 410, but the switch cover plate 410 is moved to the left as far as possible to leave room for wall features.

Figure 6:
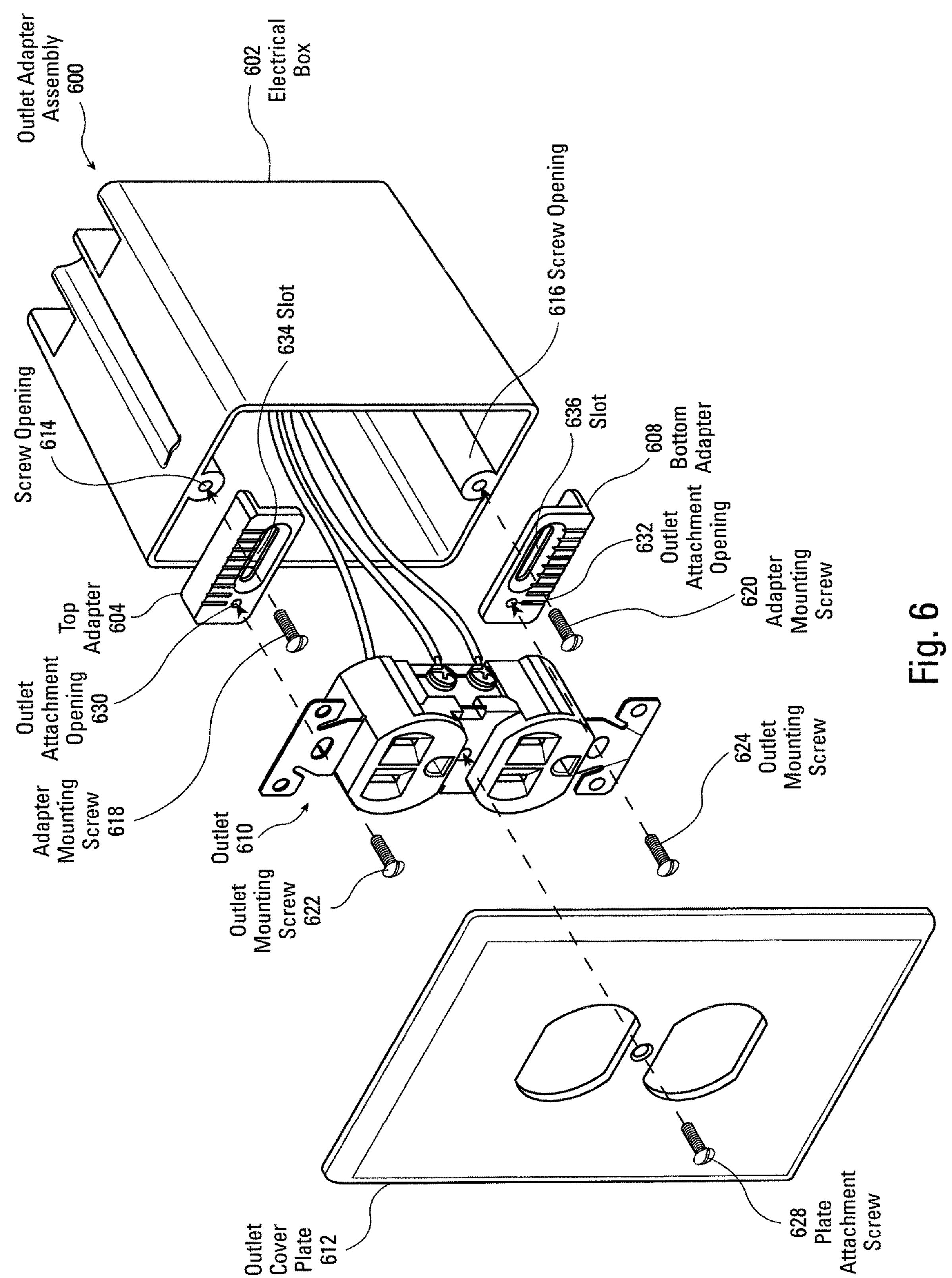
FIG. 6 is an isometric assembly view of an outlet, adapters, electrical box and outlet cover plate.

FIG. 6 is an outlet adapter assembly 600 illustrating the manner in which an outlet can be mounted in an electrical box 602 using a top adapter 604 and bottom adapter 608. Top adapter 604 is mounted by adapter mounting screw 618, which is screwed into screw opening 614 and passes through slot 634. Adapter mounting screw 620 mounts the bottom adapter 608 in slot 636 and is screwed into screw opening 616. Outlet mounting screw 622 mounts the top of the outlet 610 to the outlet attachment opening 630. Outlet mounting screw 624 mounts the bottom of the outlet 610 to the outlet attachment opening 632. Plate attachment screw 628 mounts the outlet cover plate 612 to the outlet 610.

Figure 7B:
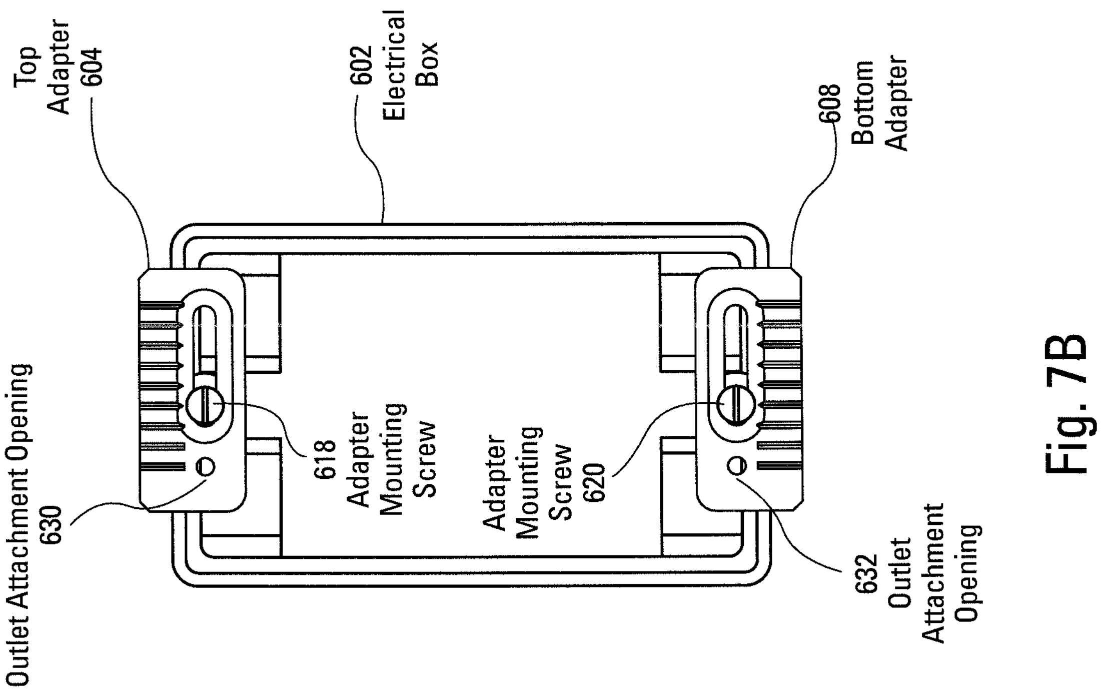
FIG. 7B is a front view of an electrical box with top and bottom adapters mounted on the electrical box.
Figure 7A:
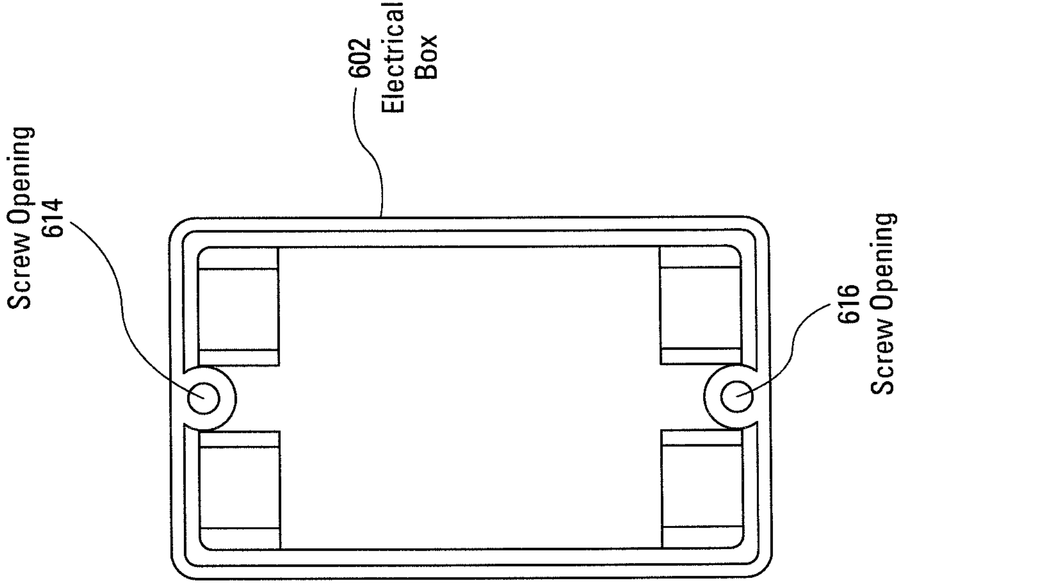
FIG. 7A is a front view of an electrical box.

FIG. 7A is a front view of the electrical box 602 illustrating screw openings 614, 616.

FIG. 7B is a front view of the electrical box 602 with a top adapter 604 and bottom adapter 608 mounted to the electrical box 602 by way of adapter mounting screws 618, 620. Outlet attachment opening 630 and outlet attachment opening 632 provide openings to mount an outlet in the electrical box 602.

Figure 7D:
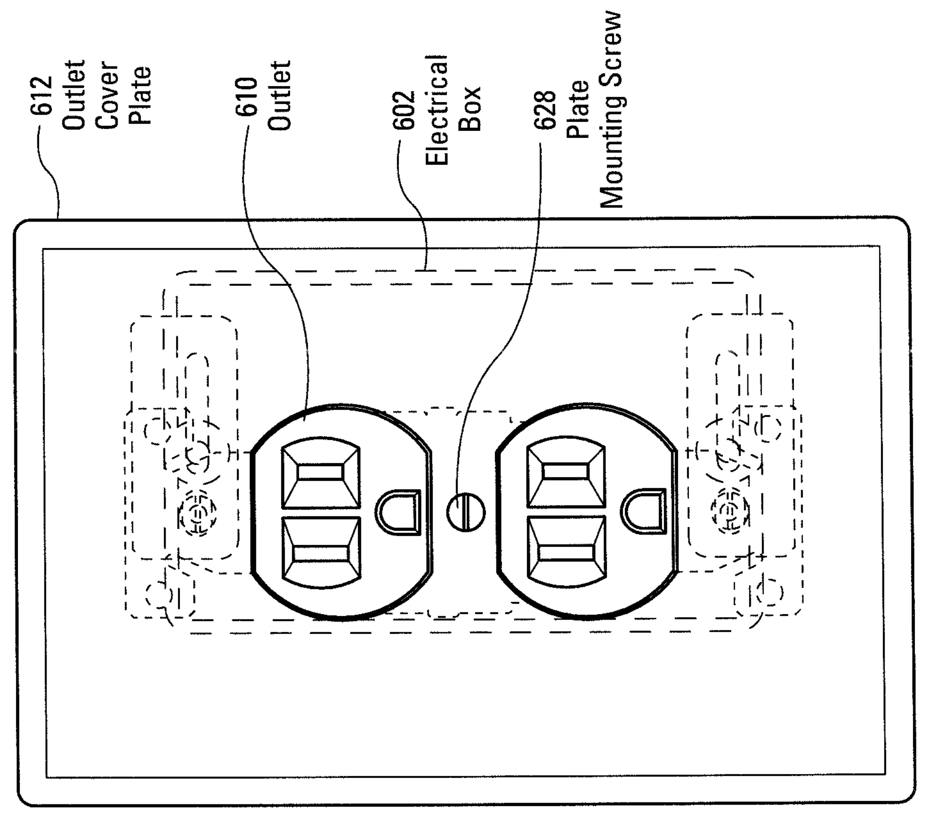
FIG. 7D is a front view of an outlet cover mounted on the outlet and electrical box of FIG. 7C.
Figure 7C:
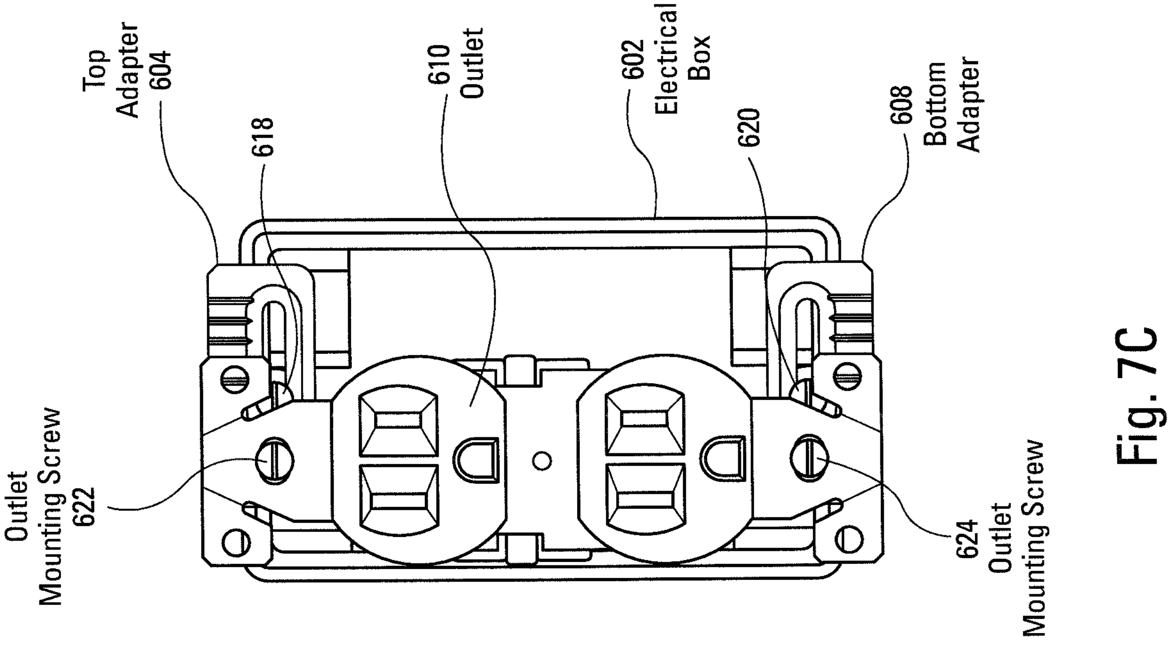
FIG. 7C is a front view of an outlet located on one side of the electrical box and mounted on top and bottom adapters.

FIG. 7C is an illustration of FIG. 7B with an outlet 610 mounted on the top adapter 604 and bottom adapter 608. Outlet mounting screws 622, 624 are screwed into the outlet attachment openings 630, 632 (FIG. 7B), respectively. Top adapter 604 and bottom adapter 608 cause the outlet 610 to be mounted on the left side of the electrical box 602.

FIG. 7D illustrates the outlet cover plate 612 mounted to the outlet 610, as shown in FIG. 7C. Plate mounting screw 628 mounts the outlet cover plate 612 to the outlet 610. As illustrated in FIG. 7D, the outlet cover plate 612 is located so that the outlet cover plate 612 is moved to the left side and adjacent to the side of the electrical box 602. Outlet cover plate 612 still covers the entire electrical box 602, but is now moved to left so that features on the wall can be accommodated. These features may include molding or other features that are close to the electrical box 602. This allows the installer of the outlet 610 to mount the outlet 610 in the electrical box and avoid any wall features that may be located close to the electrical box 602.

The present invention therefore allows switches and outlets to be mounted in a displaced location in electrical boxes and avoids the problems of tearing out drywall, removing or changing trim features on the wall, or attempting to cut outlet and switch cover plates to accommodate wall features. Additionally, the sealing effect of the wall cover plates against the wall and the electrical box are not interrupted and provides a safer adaptation since the sealing effects of the cover plate are not interrupted, such as by cutting.

Figure 8A:
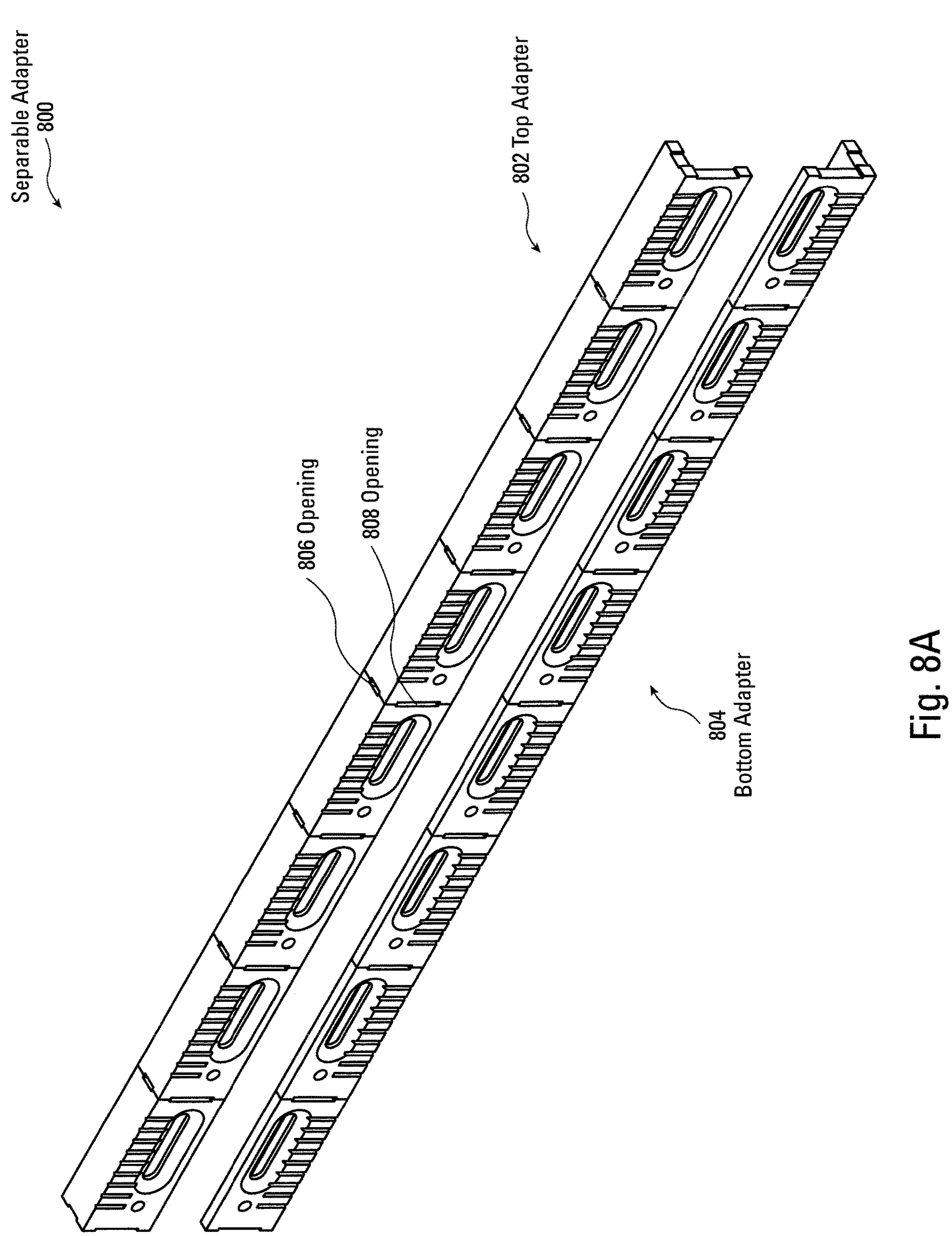
FIG. 8A is an isometric view of a separable adapter.

FIG. 8A is an isometric view of a separable adapter 800. As illustrated in FIG. 8A, the separable adapter 800 has a top adapter 802 and a bottom adapter 804. In each of the top adapter 802 and bottom adapter 804, there are openings, such as openings 806, 808, which allow the adapters 802, 804 to be cut or otherwise separated to a desired size. For example, a single adapter can be cut from either the top adapter 802 or bottom adapter 804 for a single gang electrical box. In that regard, any size can be selected. For example, by cutting the top adapter 802 at openings 806, 808, a four gang electrical box can be accommodated. In that case, the left side of the top adapter 802 can be used as the top adapter and the right side of the top adapter 802 could be used the bottom adapter in a four gang electrical box.

Figure 8B:
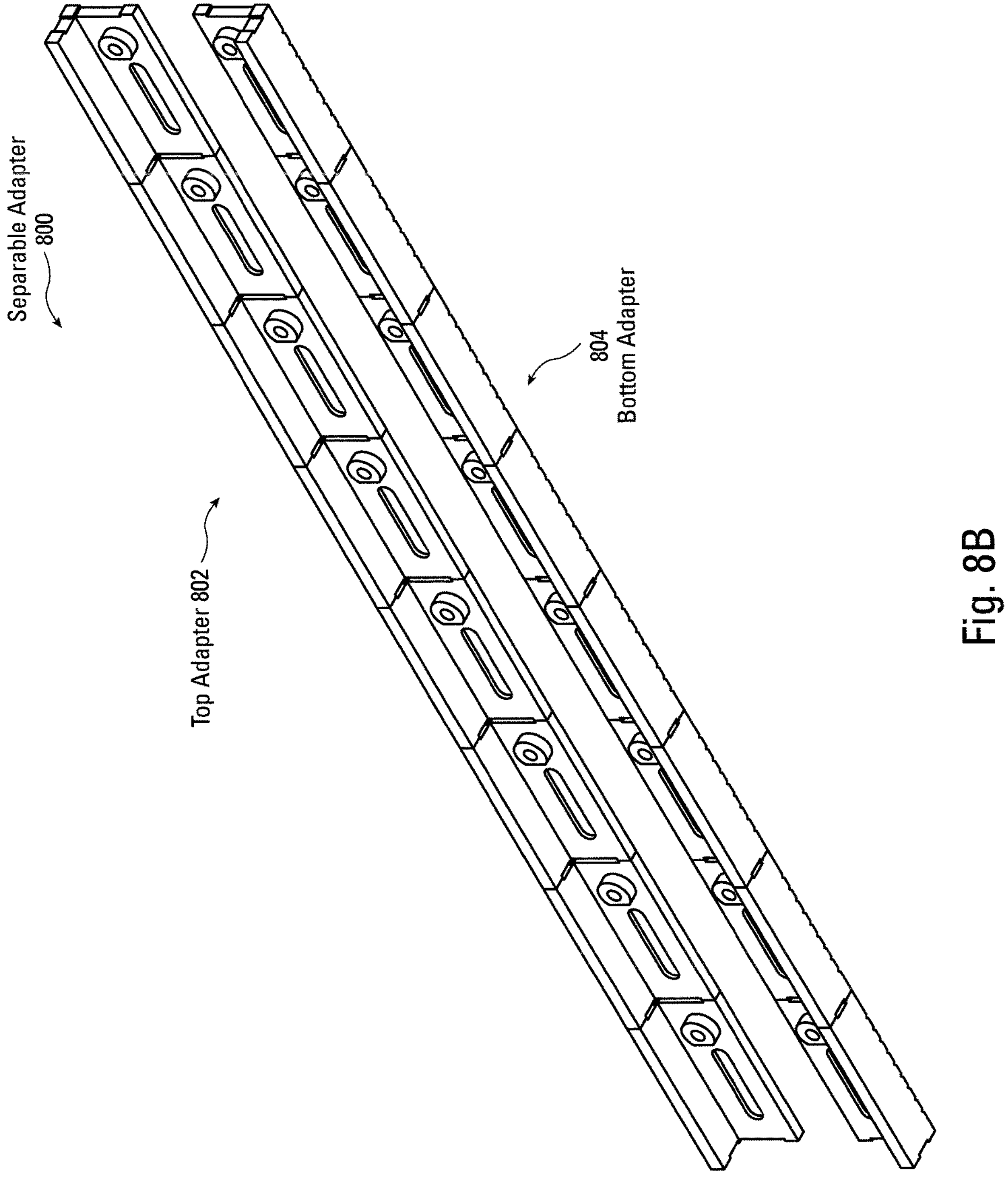
FIG. 8B is an isometric view of the back side of the separable adapter of FIG. 8A.

FIG. 8B is an isometric view of the back side of the separable adapter 800, illustrated in FIG. 8A. As shown in FIG. 8B, there is a top adapter 802 and a bottom adapter 804.

Figure 8C:
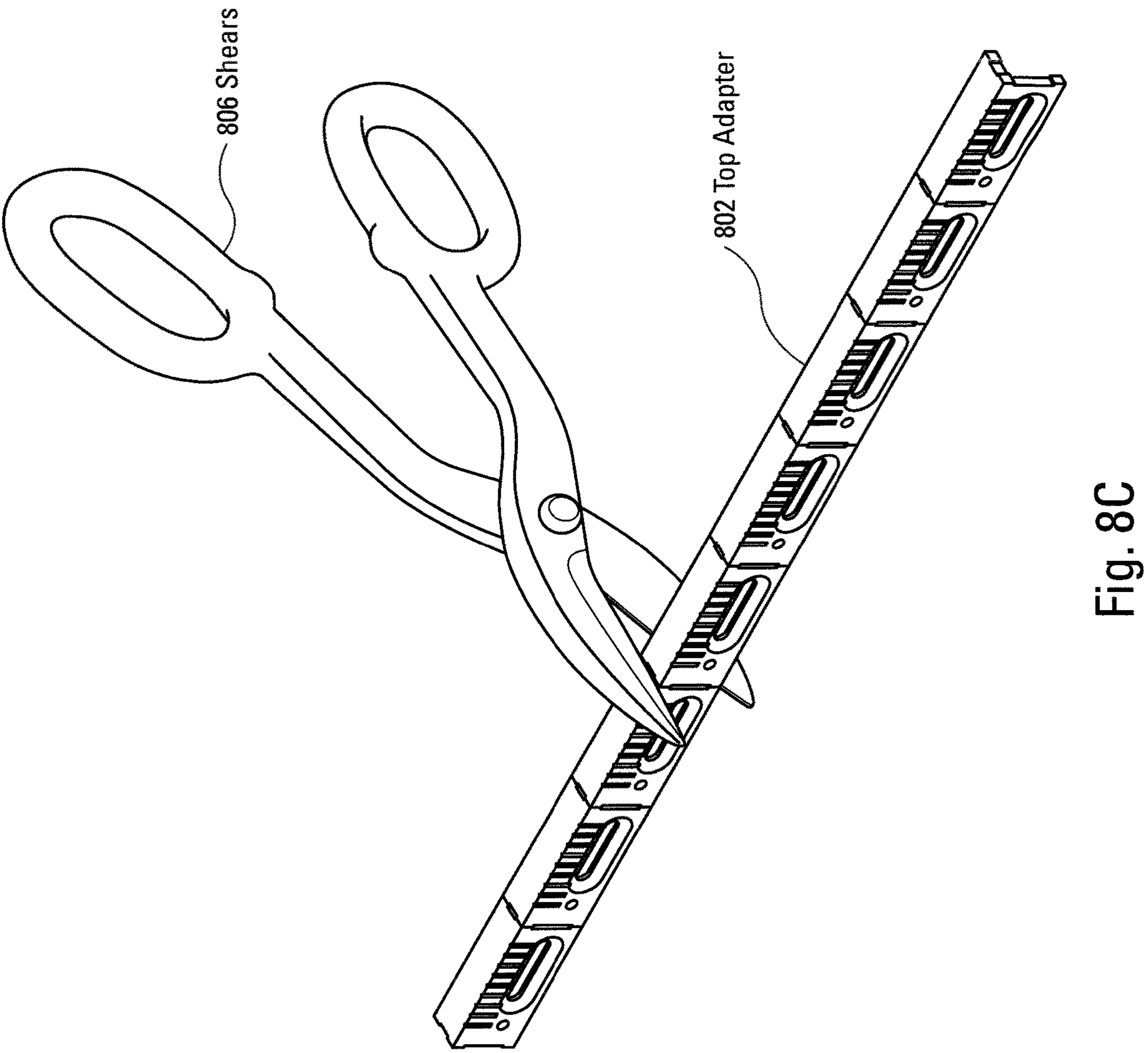
FIG. 8C is a schematic isometric view of the top adapter of FIGS. 8A and 8B with shears being used to cut the top adapter into two sections of four adapters.

FIG. 8C is a schematic isometric view of the top adapter 802 with shears 806 being used to cut the top adapter 802 into two sections of four adapters. Shears 806 can comprise metal shears, plastic shears, scissors, or other shearing devices that are sufficiently sturdy and have sufficient leverage to cut the top adapter 802. Standard scissors may not be sufficient since the adapters have to be sufficiently strong to solidly mount the switches and outlets on the electrical box.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of adjusting the lateral location of a switch or outlet in an electrical box in which said switch or outlet is placed in a desired lateral location in said electrical box to avoid interference between a cover plate attached to said switch or outlet and wall features on a wall which said electrical box is mounted comprising:

mounting a first adapter on said electrical box with a first mounting screw that passes through a first adjustment slot in said first adapter and screws into a standard electrical box opening to locate said first adapter in a position so that said switch or outlet is mounted in a said electrical box at said desired lateral location in said electrical box;

mounting a second adapter on said electrical box with a second mounting screw that passes through a second adjustment slot in said second adapter and screws into a second standard electrical box opening to locate said second adapter in a position corresponding to said position of said first adapter so that said switch or adapter is mounted in said electrical box at said desired lateral location;

mounting said switch or outlet to said first adapter with a first screw that screws into a first switch or outlet attachment opening in said first adapter so that said switch or outlet is displaced laterally to said desired lateral location in said electrical box by said first adapter;

mounting said switch or outlet to said second adapter with a second switch or outlet screw that screws into a second switch or outlet attachment opening in said second adapter so that said switch or outlet is displaced laterally to said desired lateral location in said electrical box by said second adapter.

2. The method of claim 1 further comprising:

mounting four additional adapters to dual electrical boxes;

mounting two additional switches or outlets, or one addition switch and on additional outlet to said four additional adapters so that said two additional switches or outlets are displaced in said dual electrical box.

3. The method of claim 2 further comprising:

mounting a cover plate on said switch or outlet, said cover plate being displaced laterally on said electrical box to accommodate wall features proximate to said electrical box.

4. The method of claim 3 further comprising:

separating said first adapter, said second adapter and additional adapters from a series of separable adapters that are connected together.

5. The method of claim 4 further comprising:

sliding said first adapter to a first selected position so that said first mounting screw aligns with a first selected adjustment marker on said first adapter;

sliding said second adapter to a second selected position so that said second adjustment screw aligns with a second selected adjustment marker on said second adapter, said second selected adjustment marker having a location on said second adapter that matches a corresponding location of said first selected adjustment marker on said first adapter.

6. The method of claim 4 further comprising:

positioning said switch or outlet in a location in said electrical box that is laterally displaced from a center location in said electrical box.

* * * * *